United States Patent [19]
Moriyama et al.

[11] 3,769,137
[45] Oct. 30, 1973

[54] METHOD FOR PREPARING LAMINATED FILM OF POLYMERIC SUBSTANCES

[75] Inventors: Yasuhiro Moriyama; Takafumi Okamoto, both of Osaka, Japan

[73] Assignee: Nitto Electric Industrial Co., Ltd., Osaka, Japan

[22] Filed: Apr. 26, 1971

[21] Appl. No.: 137,558

[30] Foreign Application Priority Data
Apr. 25, 1970 Japan................................. 45/35603
Oct. 8, 1970 Japan................................. 45/88975

[52] U.S. Cl................................. 156/309, 156/324
[51] Int. Cl............................. C09j 5/00, C09j 7/00
[58] Field of Search.................... 156/309, 308, 306, 156/324

[56] References Cited
UNITED STATES PATENTS

| | | | |
|---|---|---|---|
| 2,833,686 | 5/1968 | Sandt.............................. | 156/309 X |
| 3,563,830 | 2/1971 | Burgess........................... | 156/309 X |
| 3,513,064 | 5/1970 | Westley.......................... | 156/309 X |
| 3,411,965 | 11/1968 | Hobaica........................... | 156/309 X |
| 3,616,198 | 10/1971 | Saito................................ | 156/309 X |
| 3,657,038 | 4/1972 | Lightfoot......................... | 156/309 X |
| 3,329,549 | 7/1967 | Vilutis.............................. | 156/324 X |
| 3,486,961 | 12/1969 | Adams............................. | 156/324 X |
| 3,666,587 | 5/1972 | Nagao.............................. | 156/309 X |
| 3,676,289 | 7/1972 | Hara et al......................... | 156/306 X |
| 3,677,845 | 7/1972 | Roberts............................ | 156/306 X |

FOREIGN PATENTS OR APPLICATIONS

871,959   7/1961   Great Britain...................... 156/309

*Primary Examiner*—Norman G. Torchin
*Assistant Examiner*—John R. Miller, Jr.
*Attorney*—Sughrue, Rothwell, Mion, Zinn & Macpeak

[57] ABSTRACT

A method for preparing a laminated film of polymeric substances wherein each film layer constituting the laminate is closely surface bonded to each other, which method comprising heating, pressing and rolling between rollers a sandwich wherein both of the outer layers thereof are fluorocarbon resin films and at least one thermoplastic polymer is interposed therebetween as an inner layer or layers, said rollers being at a temperature not higher than the melting point of said fluorocarbon resin and not lower than 25°C.

19 Claims, 1 Drawing Figure

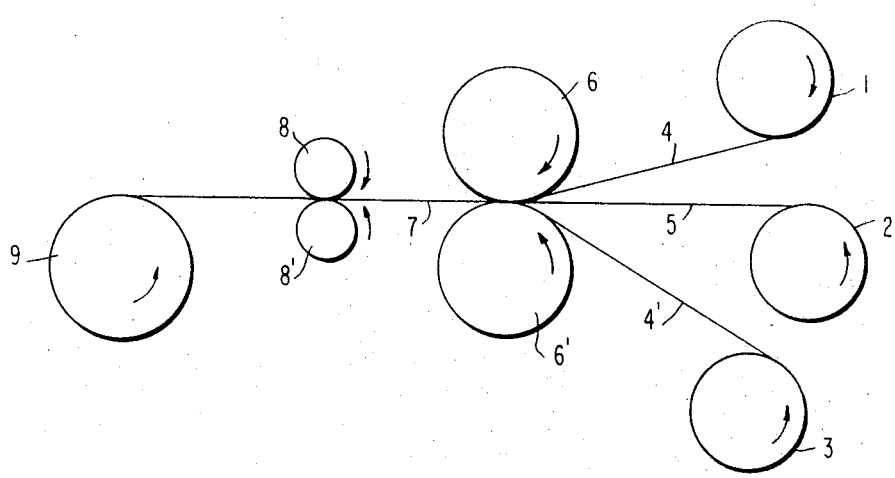

METHOD FOR PREPARING LAMINATED FILM OF POLYMERIC SUBSTANCES

BACKGROUND OF THE INVENTION

1. Field of the Invention

The present invention relates to a method for preparing a laminated film of polymeric substances. More particularly, the present invention relates to a method for preparing a laminated film of polymeric substances having, as at least one of the two outer layers thereof, rolled fluorocarbon resin films.

2. Description of the Prior Art

It has previously been well known to manufacture laminated products by effecting lamination on a press plate, under heating and pressure, or by using an extruder from which a polymeric substance is extruded through a T-die to give a film-formed material which is in turn superposed, using extrusion topping rollers, onto another film. With the former method, however, laminated products cannot be continuously obtained and, with the latter, the method generally is applied when laminates of two films are desired, it being difficult, in this case, to simultaneously laminate a large number of film strips. Furthermore, it has been extremely difficult to laminate, on a fluorocarbon resin film, and more particularly to laminate on a film of a tetrafluoroethylene polymer, other thermoplastic polymer films, because of the remarkably poor surface energy of the fluorocarbon resin film which results in poor adhesiveness.

An object of the present invention is to provide a method for preparing a laminated film in which both of the outer layers are fluorocarbon resin films and the inner layer or layers are thermoplastic polymer films.

Another object of the present invention is to provide a method for preparing the above-described film laminates in a continuous manner.

A further object of the present invention is to provide the fluorocarbon resin film laminates which are superior in their electrical and mechanical properties.

SUMMARY OF THE INVENTION

The present invention comprises, therefore, a method for manufacturing a laminated film of polymeric substances wherein each film layer constituting the laminated film is closely surface bonded to each other by heating, pressing and rolling between rollers, kept at temperatures less than the melting point of a fluorocarbon resin and above 25°C, a multilayer in which the outer layers are films of the fluorocarbon resin and at least one thermoplastic polymer film is interposed between the outer layers.

According to the present invention, there may be obtained laminated films of polymeric substances having high tensile strength and high dielectric breakdown voltage, in which each film is extremely closely surface bonded to each other.

BRIEF DESCRIPTION OF THE ACCOMPANYING DRAWING

The accompanying drawing shows an example of manufacturing devices employed in one embodiment of the method according to the present invention.

DESCRIPTION OF PREFERRED EMBODIMENTS OF THE INVENTION

In the present invention, the rolling preferably may be effected to an extent such that the thickness of the outer fluorocarbon resin film layer constituting the laminate becomes less than 60 percent of the thickness before the rolling. When this thickness becomes less than 60 percent of the thickness before the rolling, a marked improvement can be obtained in the peel strength between the layers, and the tensile strength is also improved, in proportion to the increase in draw ratio. When the thickness becomes less than 30 percent of that before the rolling, however, the mechanical strength of the laminate is lowered, so that, taking every aspect into consideration, the thickness most preferably ranges from 60 to 30 percent of the thickness before the rolling. The degree of pressing is dependent on the materials employed, their thickness, heating temperatures and the like, although the degree of pressing is in general on the order of from about 20 to 1,000 kg/cm. The rollers employed in the invention in general may be made of metals.

The fluorocarbon resin films employed according to the present invention include, by way of example, tetrafluoroethylene polymers, trifluoroethylene polymers, monochlorotrifluoroethylene polymers, copolymers between tetrafluoroethylene and hexfluoropropylene, vinylidene fluoride polymers, vinyl fluoride polymers and the like, although those films comprising the tetrafluoroethylene polymers, trifluoroethylene polymers or copolymers between tetrafluoroethylene and hexafluoropropylene are particularly preferred. Any thermoplastic polymer film may be employed in the invention, such as for example those comprising the above-described fluorocarbon resins, polyethylene, polypropylene, polyvinyl chloride, polyvinyl acetate, polyvinylidene chloride, chlorinated polyethylene, chlorinated polyproplylene, polyvinyl alcohol, copolymers between vinyl acetate and ethylene, copolymers between acrylic acid and acrylic acid ester, polycarbonates, polyesters, polyamides, polyamideimides, polyimides, polysulfones, polyphenylene-oxides and the like, at least one of which is employed.

Furthermore, according to the present invention, there may be employed films of the polymers prepared by cross-linking polyethylene, chlorinated polyethylene having chlorine content of less than 50 percent by weight, or polyethylene containing such a chlorinated polyethylene in any proportion of from 0 to 100 percent by weight. In the case of such polymers, laminates may be obtained having, in addition to the various superior properties as described in the foregoing, good properties at high temperatures, in particular, high bonding strength at high temperatures and heat resistance, and, by peeling the fluorocarbon resin on one side, laminates may be also obtained having good heat-seal properties.

The cross-linking may be carried out using any of the previously known techniques as, for example, by electron ray irradiation or by chemical cross-linking. It is generally preferred to employ cross-linked polyethylenes of a gel fraction not more than about 90 percent. The polymerization degree of polyethylene suitably is, in general, on the order of about 1 to $5 \times 10^{-4}$.

As the films of the present invention, any polymer capable of forming films, irrespective of the polymerization degree thereof both in the case of the outer layers and the inner layer or layers can be employed.

The thickness of the films may be varied broadly, although extraordinarily large thickness is not desirable from a practical standpoint because too long a period of time is required for transmission of the heat of the metal rollers into the inner layer or layers.

The heating is effected between rollers kept at temperatures not less than 25°C and not above the melting points of both of the outer fluorocarbon resin layers. These melting points are, for example, about 327°C in the case of tetrafluoroethylene polymers, from about 210° to 212°C in the case of trifluoroethylene, about 285°C in the case of copolymers between tetrafluoroethylene and hexafluoropropylene, about 170°C in the case of vinylidene fluoride polymers and about 200°C in the case of vinyl fluoride polymers.

Furthermore, on carrying out the heating as described above according to the present invention, when the temperatures of said rollers are lower than 25°C, laminated films having a sufficiently high bonding strength between the layers will not be obtained. On the contrary, when the heating is carried out at roller temperatures above the melting points of the fluorocarbon resins, the outermost fluorocarbon resin film layers will be destroyed, thereby not resulting in laminated films. More specifically, the temperatures of the rollers are preferably not less than the heat distortion temperatures of the fluorocarbon resins and not more than their melting points. For example, in the case of tetrafluoroethylene polymers, the temperatures are not less than 120°C and not more than 327°C, although, in practice, those not more than 300°C are preferred.

Reference will now be made to the accompanying drawing where an embodiment of the present invention is illustrated.

Designations 1, 2 and 3 are supply rollers of films and fluorocarbon resin films 4 and 4' are fed from the supply rollers 1 and 3, respectively, and a thermoplastic polymer film 5 from the supply roller 2. Designation 6 and 6' are heated rollers, between which heating, pressing, and rolling of the films 4, 4' and 5 are effected, thereby giving a laminate 7 which is in turn guided through guide rollers 8 and 8' and then wound up by reeling roller 9.

In addition, it is desirable to treat the inside surface of the fluorocarbon resins employed as the outermost layers in the present invention using any known adhering treatment as for example by treating the same with a treating solution of sodium naphthalene-tetrahydrofuran complex in tetrahydrofuran, or of sodium-liquid ammonia, thereby giving rise to a further enhancement in peel strength between the surface and a thermoplastic polymer film employed as the inner layer.

As described in the foregoing, one characteristic of the present invention herein described consists in a laminate manufactured using, as its outer polymer film layers, fluorocarbon resin films and we have found, to our surprise, that, as described above, by using the outermost layers composed of the fluorocarbon resin film, the rolling of the laminate can be readily effected due to its non-adhesivity and lubricating property, without any polymer film adhered onto the surface of the metal rollers when subjected to heating, rolling and laminating between the rollers, and also that, in spite of having such non-adhesivity, these fluorocarbon resin films can be surface bonded to or laminated with other thermoplastic polymers by heating under pressure. Furthermore, since the fluorocarbon resins, in general, have high melting points, and in particular, tetrafluoroethylene polymers have high melting points, the rolling and lamination can be effected at any roll temperature above the melting points or other thermoplastic polymer film or films as the inner layer or layers, with polymer films being of any type. Subsequently, in accordance with the present invention, it is possible to obtain a laminate having greater peel strength between the layers.

As is evident from the foregoing, according to the present invention, a laminate can be obtained in a continuous manner and the kind, number and thickness of the inner polymer film layer or layers and, in the case of cross-linked polyethylenes, the cross-linking methods and degrees of gel fraction can be freely chosen, so that there may be obtained readily laminates having the characteristics desired. The resulting laminates have sufficient peel strength between their layers to overcome the stress of use, to such an extent that they can be subjected to a second processing, such as cutting or punching. Furthermore, when the outermost fluorocarbon layer is rolled two times or more in the longitudinal direction, the tensile strength thereof is increased approximately two times and a marked improvement can be obtained in the dielectric breakdown voltage.

The following examples are given for purposes of illustrating the present invention and are not to be considered as limiting the scope thereof.

EXAMPLE 1

300 g of a commercial moulding powder of tetrafluoroethylene (POLYFLON M-12, m.p. 327°C, manufactured by Daikin Kogyo Co., Ltd.), was filled in a cylindrical mould having an inner diameter of 50 mm and then preformed under a pressure of 300 kg/cm². The resulting product was then, as such, sintered at a temperature of 360°C for 3 hours followed by cooling slowly the resulting sintered product to room temperature at a rate of about 0.7°C/min., thereby giving a cylindrical moulded product of about 48 mm thickness and about 62 mm length. The moulded product was then skived by a skiving method, thereby giving a film of 80μ thickness. Between two sheets of the resulting film a low density polyethylene film (SHOLEX F 121, having a melting point of 110° and 120°C and a molecular weight of 25 × 10⁴, manufactured by Japan Olefin Chemicals Co., Ltd.), was interposed and the assembly was subjected to rolling between rollers of 20 cm outside diameter kept at a temperature of 130°C so that the thickness of the resulting laminate was 150, 100 and 75 μ, thereby giving Laminates A, B and C, respectively. In this case, the roll pressure, i.e., the value calculated from the total load, applied between the rollers, divided by the film width, was 34, 90 and 125 kg/cm.

Subsequently, the above-described film of tetrafluoroethylene polymer was subjected to an adhesion treatment, on only one side surface thereof, in a conventional manner, thereby giving a Laminate D having, as in the above-described laminates, an inner layer of polyethylene film.

The various properties of the respective laminates are shown in the following Table 1.

TABLE 1

| Properties | Laminate before Rolling | Laminate after Rolling | | | |
|---|---|---|---|---|---|
| | | A | B | C | D |
| Thickness of the Laminated Film (μ) | 230 | 150 | 100 | 75 | 75 |

| | | | | | |
|---|---|---|---|---|---|
| Thickness of the Tetrafluoroethylene Film ($\mu$) | 8.0 | 60 | 40 | 30 | 75 |
| Thickness of the Polyethylene Film ($\mu$) | 70 | 30 | 20 | 15 | 15 |
| Peel Strength between the Tetrafluoroethylene Film and the Polyethylene Film | 0 | 15 | 67 | 70 | 150 |
| Dielectric Breakdown Average Voltage (KV/0.1 mm) Minimum | 6.8 4.5 | 7.2 5.7 | 11.2 9.5 | 11.8 9.7 | 12.8 9.4 |
| Tensile Strength (in the direction of elongation) (kg/mm²) | — | 3.0 | 5.5 | 7.6 | 7.4 |
| Elongation (in the direction of elongation) (%) | — | 20.0 | 90 | 60 | 60 |

The tensile strength, elongation and peel strength were all measured with an Instron Tensil Tester at a crosshead velocity of 300 mm/min. The peel strength was estimated as the strength in g/25 mm on peeling at 180° relative to the surface of the specimen. The dielectric breakdown voltage was measured according to A.S.T.M. D-149.

As is evident from the results shown in Table 1 above, Laminates B and C are superior in every respect to the Laminate A. In particular, Laminates B and C are markedly superior in peel strength to Laminate A. These results, after all, indicate that extremely good results can be obtained by setting the thickness of the roller and laminated product at less than 60 percent of the original thickness thereof. They also indicate that there can be obtained a marked improvement in peel strength between the layers by applying the adhesion treatment.

EXAMPLE 2

The cylindrically moulded product of the tetrafluoroethylene polymer employed in Example 1 was skived by a skiving method to produce a film of 50 $\mu$ thickness. Four sheets of the film were placed on the surface of each other and then rolled and laminated between the same rollers as employed in Example 1, using a roll temperature of 200°C, in a manner such that thicknesses obtained after the rolling and lamination were the values indicated in Table 2 described hereinafter. In this case, the roll pressures between the rollers were as follows:

Laminate E — 12 kg/cm
Laminate F — 30 kg/cm
Laminate G — 52 kg/cm
Laminate H — 88 kg/cm
Laminate I — 120 kg/cm In the resulting laminated films the thicknesses of which were not more than 60 percent of their original, the peel strength between the layers was 50 g/25 mm width. This strength is sufficient to employ the laminates for practical use and to subject them to secondary processing such as punching or cutting processing.

The laminates thus obtained had, in their electrical properties no defects resulting from pinholes. Furthermore, about twice an improvement in their tensile strength was obtained also.

The characteristics obtained in the resulting laminated films which are rolled or unrolled are summarized in the following Table 2.

As is evident from the results shown in Table 2 above, in laminates treated so that their thickness after rolling was not more than 60 percent of their original thickness, a remarkable improvement in their electrical properties, as well as in the peel strength can be obtained. Furthermore, it is to be noted also that, in this example, the defect inherent to tetrafluoroethylene polymer films obtained by skiving method, i.e., low electrical and mechanical strength due to their pinholes, were covered. Thus, the present example demonstrates that a multilayer tetrafluoroethylene polymer is integrated to cover the defect caused by pinholes and the integrated multilayer is then rolled to reduce the number of pinholes, thereby improving its mechanical properties.

EXAMPLE 3

Using as the outer layers two tetrafluoroethylene polymer films of the same type used in Example 2, each being of 50$\mu$ thickness, and, as the inner layers, two low density polyethylene films of 50$\mu$ thickness and of the same type as employed in Example 1 between which a polycarbonate film ("UPILON" having a melting point of 230°C and a molecular weight of $3.2 \times 10^4$, manufactured by Mitsubishi-Edogawa Chemical Co., Ltd.), of 70$\mu$ thickness had been interposed, a laminate was manufactured by rolling and laminating the assembly at a roll temperature of 180°C in a manner such that the laminate thus laminated was of 110$\mu$ thickness. In the present example, there was employed a roll pressure of 70 kg./cm.

The surface of the resulting laminate shows the properties of the tetrafluoroethylene resins, i.e., low friction factor, non-adhesivity and the like together with large rigidity and strength which are not shown in the tetrafluoroethylene resins. In this example, the peel strength between the tetrafluoroethylene polymer and the polyethylene film was 70 g/25 mm. Various properties of the laminate and a tetrafluoroethylene polymer film of 110$\mu$ thickness which is skived from the cylindrically moulded tetrafluoroethylene resin of the same type as employed in Example 1 are shown in the following Table 3.

TABLE 3

| Properties | Laminate | Polytetrafluoroethylene Film |
|---|---|---|
| Thickness of Polytetrafluoroethylene ($\mu$) | 25 | 110 |
| Thickness of Polyethylene Film ($\mu$) | 10–13 | — |
| Thickness of Polycarbonate Film ($\mu$) | 35 | — |
| Tensile Strength (in the direction of elongation)(in kg/mm²) | 7.2 | 2.1 |
| Elongation (in the direction of elongation)(in kg/mm²) | 60 | 300 |
| Tensile Elasticity (in the direction of elongation)(in kg/mm²) | 170 | 40 |

It is evident from the results shown in Table 3 above that, as compared with the polytetrafluoroethylene

TABLE 2

| Properties | Laminate before rolling | Laminate after rolling | | | | |
|---|---|---|---|---|---|---|
| | | E | F | G | H | I |
| Thickness ($\mu$) | 200 | 180 | 150 | 120 | 100 | 80 |
| Peel strength between layers (g/25 mm) | 0 | 0 | 7 | 46 | 53 | 56 |
| Dielectric breakdown voltage (KV/0.1 mm) Average... | 8.0 | 9.1 | 9.8 | 12.5 | 13.6 | 13.5 |
| Minimum... | 7.1 | 8.0 | 8.5 | 10.6 | 11.4 | 11.7 |
| Dielectric breakdown voltage in unlaminated and untreated laminate (KV/0.1 mm) Average... | 6.7 | 7.1 | 7.0 | 7.4 | 7.4 | 7.5 |
| Minimum... | 4.0 | 4.6 | 4.7 | 4.5 | 4.2 | 4.1 | film, the laminate is markedly improved in its tensile elasticity and tensile strength.

EXAMPLE 4

Between two films of a tetrafluoroethylene-hexafluoroethylene copolymer ("TEFLON FEP", hexafluoropropylene content 15–16 wt percent, m.p. 285°C, manufactured by E. I. Du Pont de Nemours), each being of 100 μ thickness, was interposed a tetrafluoroethylene polymer film of the same type as employed in Example 3, and the assembly was laminated by heating and rolling the same between the same metal rollers as employed in Example 3 which were kept at a temperature of 120°C, in a manner such that the rusulting laminate was of 125 μ. In the present example, there was employed a roll pressure of 220 kg/cm. The thickness of the outermost layers was 50 μ, and the peel strength between the layers was 40 g/25 mm. The resulting laminate is also characterized as having heat seal properties.

EXAMPLE 5

One side surface of the film of 50 μ thickness manufactured by extrusion moulding of "DYFLON M-300P" (polytrifluoroethylene having a melting point of 212°C and molecular weight of $8.7 \times 10^4$, manufactured by Daikin Kogyo Co., Ltd.), was subjected to an adhesion treatment using the same sodium complex salt as employed in Example 1. Between these two films where the treated surface of each was in a face-to-face position was interposed a film of 50μ thickness prepared by extrusion moulding of TORAY's MOULDING NYLON CM 1031 (polyamide of nylon 6 type, m.p. 215°C, manufactured by Toray Industries, Inc.), followed by rolling between two rollers kept at a temperature of 140°C in a manner such that the thickness of the resulting laminate was of 75 μ thickness. In this case, the roll pressure between the rollers was 120 kg/cm. According to this procedure, there was obtained a laminate superior in its mechanical and electrical properties.

EXAMPLE 6

Polyvinylidene fluoride ("Kynar No. 300" having a melting point of 170°C and a molecular weight of $5 \times 10^5$, manufactured by Pennsalt Chem. Co.), was extrusion moulded to obtain a film of 100 μ thickness, one side surface of which was then subjected to an adhesion treatment using the same sodium complex salt as employed in Example 1. Between these two films in which the treated surface of each was in a face-to-face position was interposed a diacetylcellulose film ("Acetylol Sheet VRR-124", having a softening point of 91°C, manufactured by Daisel Ltd.), followed by pressing the assembly between two rollers kept at a temperature of 100°C to effect rolling in a manner such that the thickness of the resulting laminate was 125 μ. The roll pressure between the rollers, in this case, was 130 kg/cm. There was obtained the laminate which is superior in its mechanical and electrical properties.

EXAMPLE 7

Between two skived polytetrafluoroethylene (m.p. 327°C), films of 50μ thickness was interposed a cross-linked polyethylene of 100 μ thickness ("IRAX FILM" manufactured by Sumitomo Denko KK., cross-linked by electron beam irradiation, gel fraction 44 percent, molecular weight $2 \times 10^4$), and the assembly was passed between two metal rollers having an outer diameter of 20 cm and kept at a temperature of 150°C where it was heated, rolled and laminated to obtain polymer Laminates J, K or L of 130, 120 or 100 μ thickness, respectively. The roll pressures between the rollers were 40, 50 and 60 kg/cm, respectively. The various characteristics of each laminate are shown in the following Table 4.

The tensile strength, elongation and peel strength were all measured with an Instron Tensil Tester at a crosshead velocity of 300 mm/min. The peel strengths were estimated as the length in g/25 cm on peeling at 180° relative to the surface of the specimen. The dielectric breakdown was measured according to A.S.T.M. D-149.

TABLE 4

| Properties | Laminate J | K | L |
|---|---|---|---|
| Thickness of Laminate (μ) | 132 | 120 | 100 |
| Thickness of Tetrafluoroethylene Film (μ) | 33 | 30 | 25 |
| Thickness of Cross-Linked Polyethylene (μ) | 66 | 60 | 50 |
| Peel Strength between the Tetrafluoroethylene Layer and the Polyethylene Film Layer (in g/25 cm) | 12 | 55 | 68 |
| Dielectric Breakdown — Mean Voltage (in KV/0.1 mm) — | 7.0 | 10.8 | 11.5 |
| Minimum | 5.6 | 9.3 | 9.6 |
| Tensile Strength (in the direction of elongation) (in kg/mm²) | 2.4 | 5.3 | 6.2 |
| Elongation (in the direction of elongation)(%) | 200 | 120 | 9.0 |

As is evident from the results shown in Table 4 above, Laminates K and L are superior in every respect to Laminate J. In particular, Laminates B and C are markedly superior in peel strength to Laminate A. These results, after all, demonstate the fact that, when the thickness of the laminate is lowered by rolling to not more than 60 percent of its original thickness, there may be obtained extremely preferred results.

Furthermore, when either of the two polytetrafluoroethylene films is stripped from the laminate thus obtained, the resulting laminate possesses heat seal properties.

EXAMPLE 8

Following the procedure described in Example 7 but using a cross-linked polyethylene film of 80μ thickness obtained by admixing, with the cross-linked polyethylene film, a chlorinated polyethylene (chlorine content 35 wt percent) in an amount of 30 percent by weight, there was obtained a laminate of 90μ thickness. The roll pressure on pressing was 70 kg/cm. The characteristics of the resulting laminate were almost the same as in the laminate obtained in Example 7, which include, unlike the latter, firing resistance.

EXAMPLE 9

Between two films of the same tetrafluoroethylene-hexafluoroethylene copolymer as employed in Example 4, each being of 60 μ thickness, was interposed a cross-linked polyethylene of the same type as employed in Example 7 and of 50 μ thickness. The assembly was then rolled and laminated, as in Example 7, using a roller temperature of 140°C and roller pressure of 70 kg/cm, thereby giving a laminate of 70 μ thickness. The peel strength between the layers of the resulting laminate was 42 g/25 cm.

Although the invention has been described in considerable detail with reference to certain preferred embodiments thereof, it will be understood that variations and modifications can be effected without departing from the spirit and scope of the invention as described hereinabove and as defined in the appended claims.

What is claimed is:

1. A method of forming a laminate having a high tensile strength and dielectric breakdown voltage, said laminate consisting essentially of outer layers of a fluorocarbon resin film and, interposed between said outer layers, at least one film layer of a film-forming thermoplastic resin, each layer of said laminate being strongly surface-bonded to each adjacent layer thereof to provide a high peel strength between said adjacent layers, said method comprising:
   1. forming a laminate of an outer layer of a fluorocarbon resin film, an intermediate layer of at least one film of a film-forming thermoplastic resin and an outer layer of a fluorocarbon resin film; and
   2. passing said laminate through a pair of compression rollers heated to a temperature of from 25°C to the melting point of said fluorocarbon resin to simultaneously heat, compress and roll-draw said laminate thereby strongly surface-bonding said adjacent layers to each other and simultaneously reducing the thickness of both of said outer layers to a thickness equal to from 30 to 60 percent of their thicknesses prior to said rolling.

2. The method according to claim 1 further comprising after said step (2), stripping from the resulting laminate one of said outer layers of fluorocarbon resin film to provide a laminated film having heat sealing properties.

3. The method according to claim 1, wherein the heating is effected at a temperature not more than the melting point of said fluorocarbon resin constituting the outer layers and not less than the heat distortion temperature thereof.

4. The method according to claim 1, wherein the heating is effected at a temperature not more than the melting point of said fluorocarbon resin constituting the outer layers and not less than the melting point of said film-forming thermoplastic resin constituting the inner layer or layers.

5. The method according to claim 1, wherein said fluorocarbon resin is a tetrafluoroethylene polymer.

6. The method according to claim 1, wherein said fluorocarbon resin is a copolymer of tetrafluoroethylene and hexafluoropropylene.

7. The method according to claim 1, wherein said fluorocarbon resin is a trifluoroethylene polymer.

8. The method according to claim 1, wherein said fluorocarbon resin is a vinylidene fluoride polymer.

9. The method according to claim 1, wherein the surfaces of the outer layers of the fluorocarbon resin films adjacent to said inner layer or layers are adhesion-treated.

10. The method according to claim 9 wherein said adhesion treatment comprises treating said surfaces with a solution of a sodium naphthalene-tetrahydrofuran complex in tetrahydrofuran or with a solution of sodium-liquid ammonia.

11. The method according to claim 1 wherein said film-forming thermoplastic resin is selected from the group consisting of polypropylene, polyvinyl chloride, polyvinyl acetate, polyvinylidene chloride, polyvinyl alcohol, vinyl acetate-ethylene copolymers, acrylic acid-acrylic acid ester copolymers, polyesters, polyamideimides, polyimides, polysulfones, polyphenylene oxides and mixtures thereof.

12. The method according to claim 1, wherein said film-forming thermoplastic resin of the inner layer or layers is a fluorocarbon resin.

13. The method according to claim 1, wherein said film-forming thermoplastic resin of the inner layer or layers is a polyethylene.

14. The method according to claim 1, wherein said film-forming thermoplastic resin of the inner layer or layers is a polycarbonate.

15. The method according to claim 1, wherein said film-forming thermoplastic resin of the inner layer or layers is a tetrafluoroethylene polymer.

16. The method according to claim 1, wherein said film-forming thermoplastic resin of the inner layer or layers is a polyamide.

17. The method according to claim 1, wherein said film-forming thermoplastic resin of the inner layer or layers is a diacetylcellulose.

18. The method according to claim 1, wherein said film-forming thermoplastic resin is obtained by crosslinking a polyethylene containing from 0 to 100 wt percent of chlorinated polyethylene with a chlorine content of not more than 50 percent by weight.

19. The method according to claim 18, wherein said crosslinked polyethylene has a gel fraction not more than 90 percent.

* * * * *